United States Patent [19]

Carlstedt

[11] Patent Number: 4,960,215
[45] Date of Patent: Oct. 2, 1990

[54] FRICTION ELASTOMER DRAFT GEAR

[75] Inventor: Richard A. Carlstedt, Wheaton, Ill.

[73] Assignee: Miner Enterprises, Inc., Geneva, Ill.

[21] Appl. No.: 288,663

[22] Filed: Dec. 22, 1988

[51] Int. Cl.$^5$ .......................... B61G 9/08; B61G 11/10
[52] U.S. Cl. ..................................... 213/33; 213/32 R; 267/202
[58] Field of Search ............... 213/22, 28, 32 A, 32 C, 213/32 R, 33; 267/202, 203

[56] References Cited

U.S. PATENT DOCUMENTS

| | | | |
|---|---|---|---|
| 3,386,597 | 6/1968 | Willison et al. | 213/32 R |
| 4,305,514 | 12/1981 | Zanow et al. | 213/32 R |
| 4,591,059 | 5/1986 | Hammarlund | 213/32 R |
| 4,735,328 | 4/1988 | Carlstedt | 213/33 |

Primary Examiner—Andres Kashnikow
Assistant Examiner—Virna Lissi Mojica

[57] ABSTRACT

The draft gear includes: friction elements; coil spring elements; and elastomer elements. With respect to the friction elements, three groups of friction surfaces are defined each of which create a specific angle with respect to a centerline passing down the center of the draft gear. The elastomer elements are interconnected multiple segmented columns having specific heights and occupying particular volumes with respect to the coil spring elements. Particular hardness and number of segments of the elastomer elements are also defined.

9 Claims, 5 Drawing Sheets

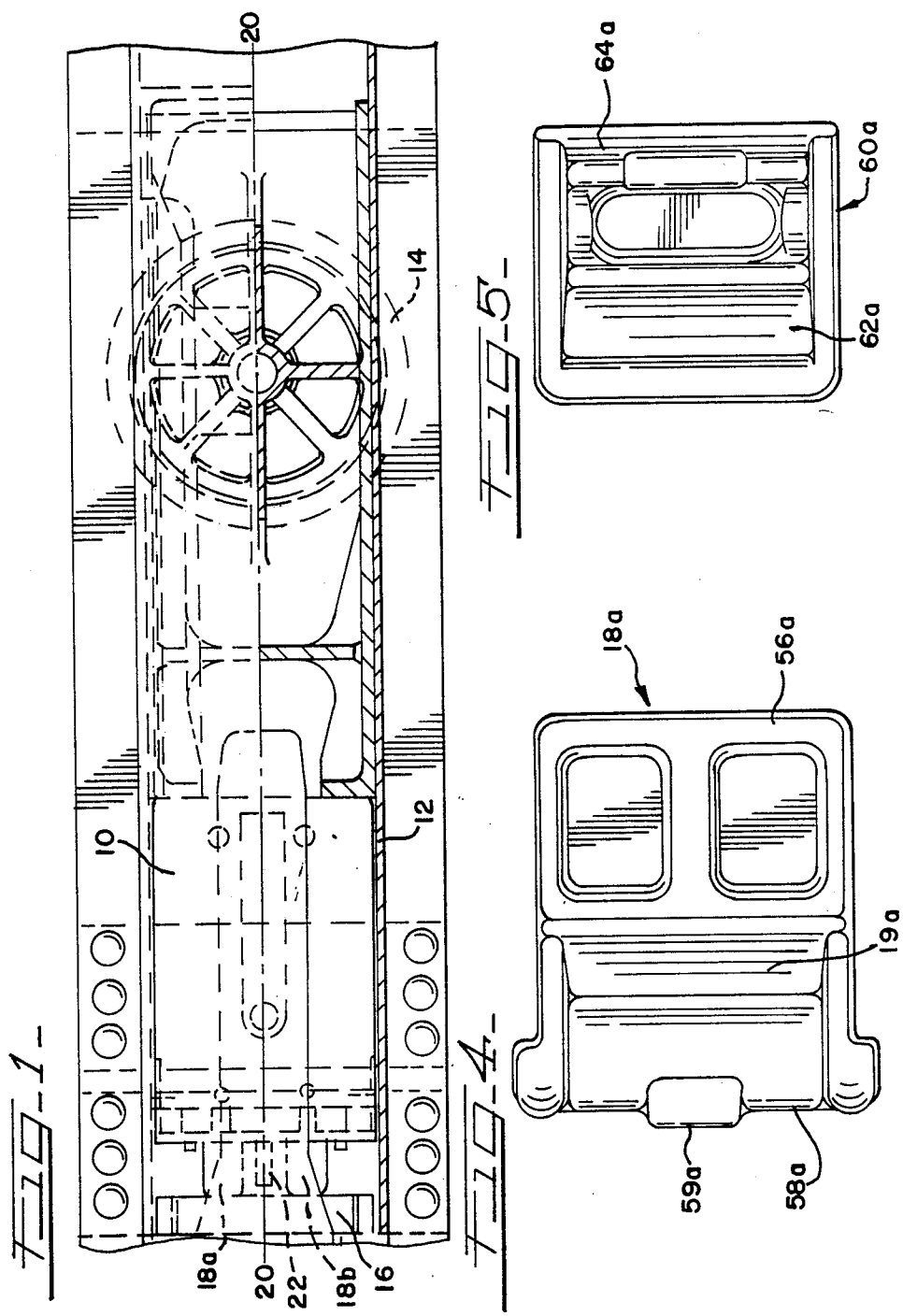

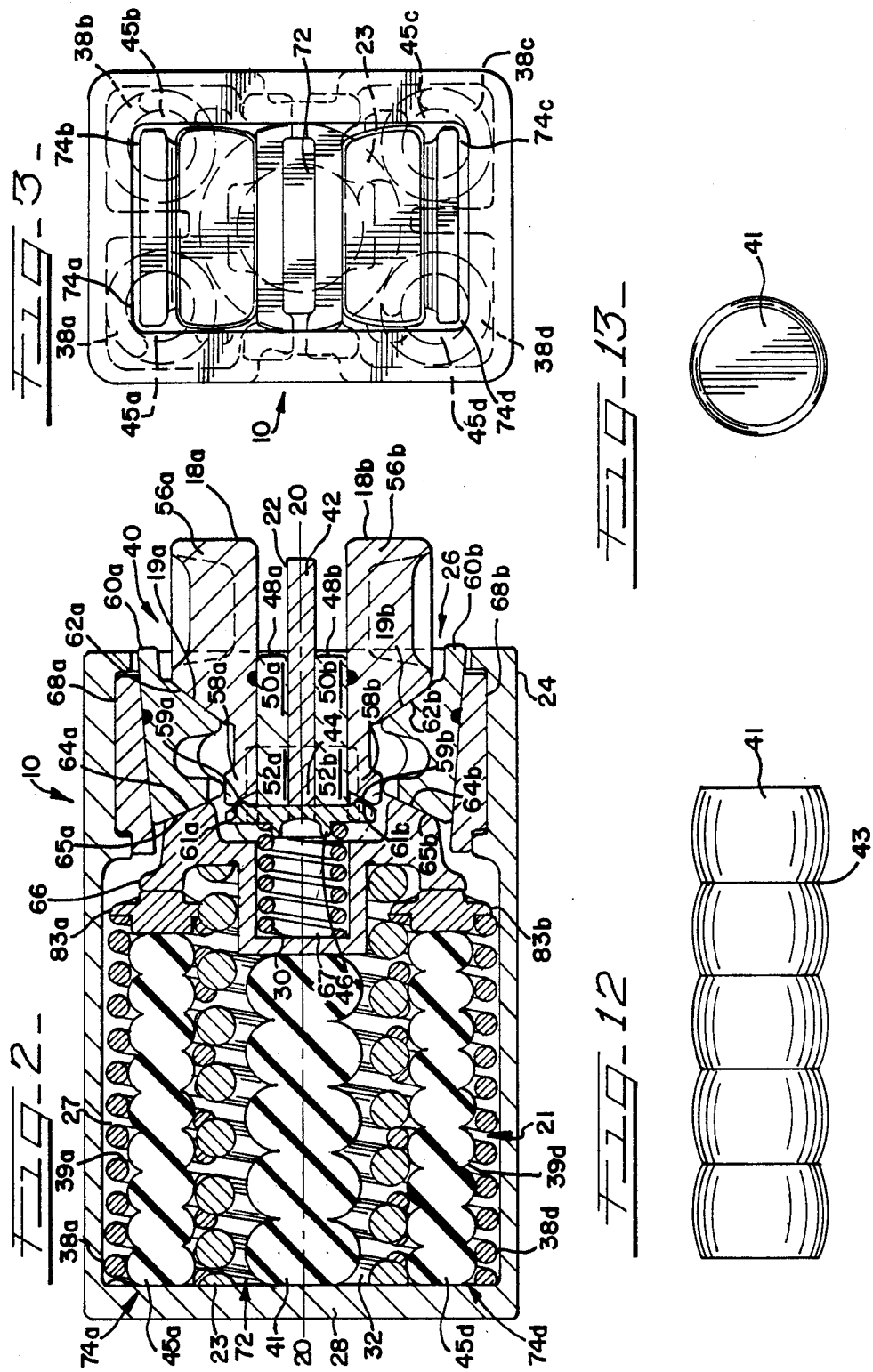

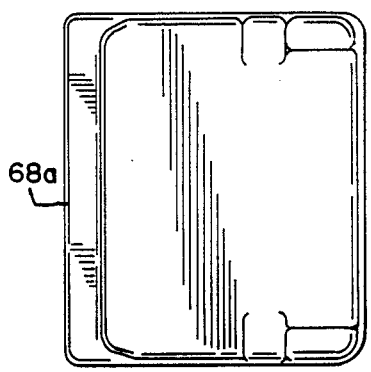
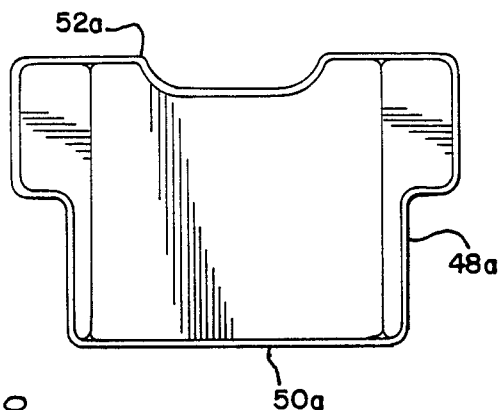
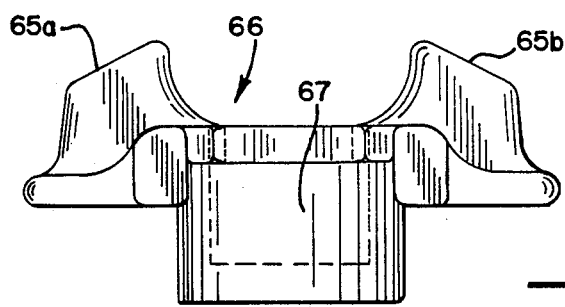
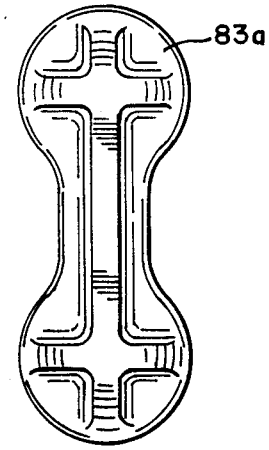
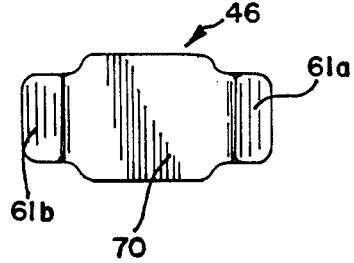

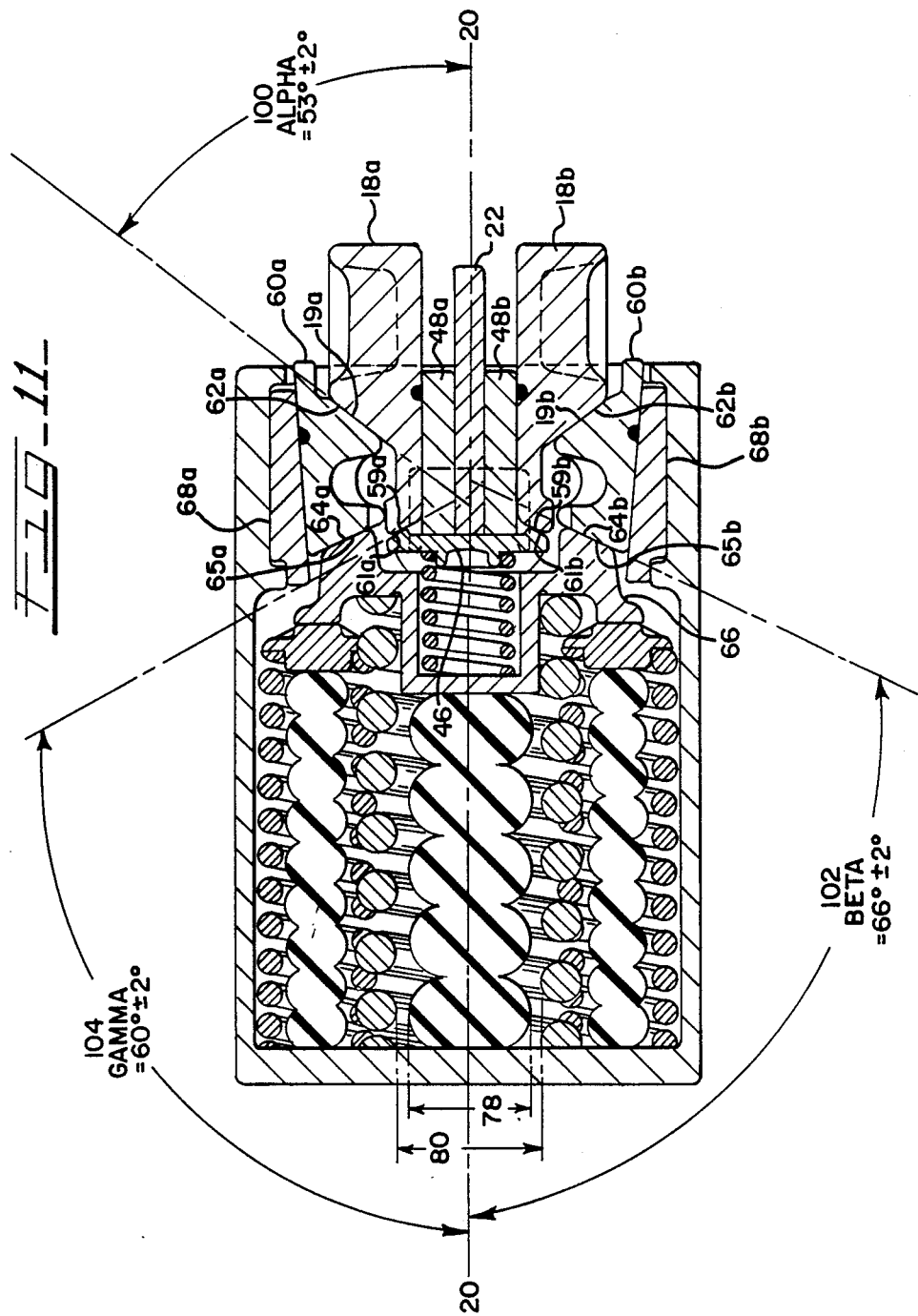

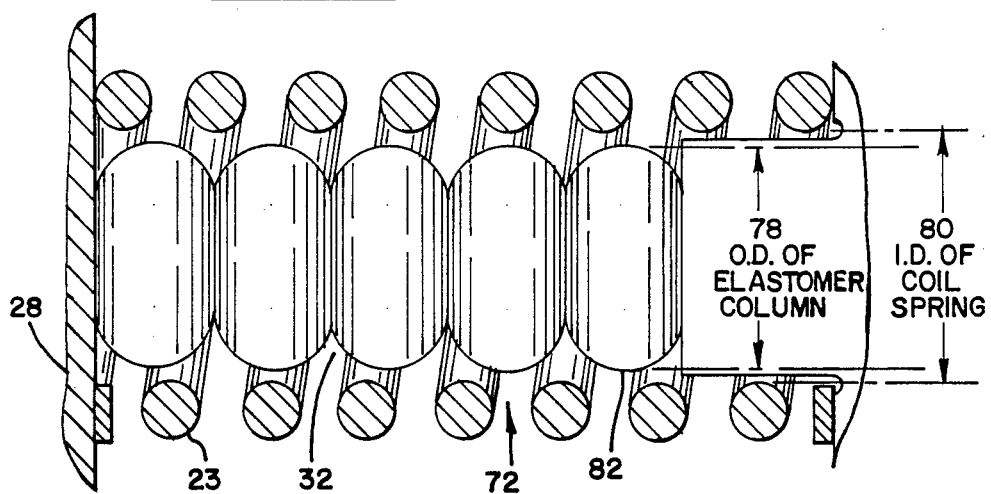
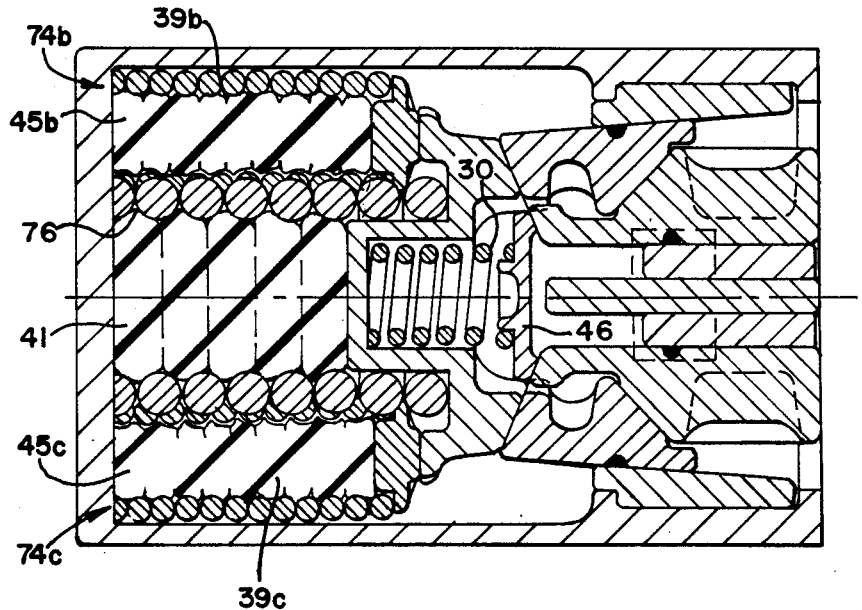

FRICTION ELASTOMER DRAFT GEAR

BACKGROUND OF THE INVENTION

A.A.R. M-901G-82 was drafted to deal with the proliferation of heavier, 125 ton cars, and specifically the high performance draft gears being employed. In order to test and evaluate a product's suitability for this more demanding service, the railroad industry adopted a performance specification for rating a draft gear's ability to cushion the collision of one seventy-ton freight car impacting into a stationary seventy-ton car. To meet specification requirements, a collision speed of at least 5.0 MPH must be achieved while the resulting peak force (impact force) acting on each car's coupler remains below 500,000 lbs. A device which passes this threshold test is also tested statically for a resisting force of at least 8,000 lbs. Then, each test gear is subjected to substantial energy input under a drop hammer, after which each gear must repeat the same freight car collision test and again achieve at least 5.0 MPH at less then 500,000 lbs. coupler force. A further requirement is the combined draft and buff travel of the device cannot exceed six and one-half inches. To be successful, most draft gears must undergo long smooth travels during collision, taking advantage of a substantial portion of the available buff travel.

Since the adoption of the freight car impact performance specification by the industry, all existing friction-type draft gears, as well as new ones since introduced to the market, which were rated by existing drop hammer performance specifications, have been unable to meet the requirements of the freight car impact specification (AAR M-901G-82). The principal reason is the substantial increase in frictional resistance to closure exhibited by friction-type draft gears after a moderate amount of energy input. A friction-type gear that initially met the 5.0 MPH/500,000 lbs. coupler force requirement would not successfully repeat the impact test after the gear's various friction parts wore into increased contact during the drop hammer energy input portion of the specification procedure. Coupler forces would typically be greater than 500,000 lbs. at a collision speed of less than 5.0 MPH during the follow-up impact test. The essence of the problem has been that heretofore, friction-type gears did not incorporate the technology necessary to adequately control frictional resistance throughout the duration of the freight car impact specification, and therefore could not meet its requirements.

Prior to the invention described herein, only devices utilizing expensive, leakage prone hydraulic dampers in one form or another have been able to satisfy the freight car impact rating specification. Mixed type draft gears comprising both a friction mechanism and a hydraulic damper, which have met the specification, have the inherent disadvantage of added cost as well as sacrificed spring capacity, as compared to a friction-type gear having only a friction mechanism and resisting spring package. Hydraulic type gears qualified under the specification rely on internal gas pressure as a means of returning the device to datumn after an operating stroke. The drawback to such technology is the poor static load resistance provided by the gas spring, in addition to high cost. Clearly, the friction/elastomeric type draft gear of this invention is preferred for modern heavy haulage service.

A complete copy of Specification M-901G-82 may be secured from the Association of American Railroads, Mechanical Division, Manual of Standards and Recommended Practices, at 50 F Street N.W., Washington, D.C. 20001. This Specification is hereby incorporated by reference hereinto.

Up to this time, no-all friction, no all-elastomer, and no friction-elastomer draft gear has been designed which satisfactorily could meet these performance specifications; this in spite of the costs and service problems with hydraulic-type draft gears. Basic among the problems facing elastomer-type draft gears was an elastomer could not be found which provided the needed energy absorption over commercially acceptable lifetimes. Friction gears could not be made smooth enough over the typical 3¼ inch long buff travel available. Additionally, after the energy input and wearing of parts, it was found that they could not meet the second impact test involving the 70 ton rail cars moving at five miles an hour and with the needed travel while keeping the impact forces below 500,000 lbs.

BRIEF SUMMARY OF THE INVENTION

Briefly stated, the invention hereunder consideration is based upon a friction-type draft gear wherein the friction wedge angles have been modified and the all-steel spring package has been changed with the inclusion of tailored monoblock elastomer springs. In order to achieve a smooth gear with controlled friction, four of the six friction surfaces are provided with lubricating bronze inserts. The particular draft gear identified in U.S. Pat. No. 4,735,328 issued Apr. 5, 1988 to Richard A. Carlstedt is a typical friction draft gear. The monoblock elastomer spring employed is disclosed in U.S. Pat. No. 4,198,037 issued Apr. 15, 1980 to David G. Anderson. Both of these patents are incorporated by reference herein. The principal object of the present invention is to provide a friction/elastomer draft gear which meets the requirements of AAR Specification M-901G-82.

DESCRIPTION OF THE DRAWINGS

The following description of the invention will be better understood by reference to the attached drawings wherein:

FIG. 1 is a fragmentary view showing the draft gear in relation to a freight car sill and bolster. Some parts being broken away while other parts are omitted to simplify the illustration;

FIG. 2 is a plan view of the draft gear of this invention in cross section;

FIG. 3 is a end view of the draft gear of FIG. 2;

FIGS. 4–10 are plane views of friction component parts of the draft gear;

FIG. 11 is a second plan view of the draft gear in cross section showing the angles of various components involved;

FIG. 12 is a plane view of an elastomer column in the free state;

FIG. 13 is a end view of FIG. 12;

FIG. 14 is a partial view of the elastomer column subject to a preload showing the various dimensions involved; and FIG. 15 is a plan view of the draft gear shown in FIG. 2, but at a maximum travel such as when subject to an external force.

DETAILED DESCRIPTION OF THE INVENTION

In FIG. 1 is illustrated the friction elastomer draft gear means 10 showing its relationship to the sill means 12 and a portion of the bolster means 14. The follower means 16 is shown positioned adjacent the friction wedges 18a and 18b while the centrally located major axis of the draft gear means 10 is represented by the line 20. It should be understood that the major axis divides the gear into two symmetrical halves, and as can be shown in FIG. 2, runs down the center of the friction plate means 22.

As shown in FIG. 2, the draft gear means 10 includes a hollow housing means 24 having a generally tubular body with a first open end means 26 and a second closed end means or bottom 28, the major axis line 20 being centrally disposed the length thereof. A spring system means 21 incorporating a first and second series of coil steel springs, as well as a first and second series of elastomer spring means, is disposed within the lower portion 27 of said hollow housing means 24 adjacent said second closed end means 28. Included in the first series of coil steel springs is a middle coil spring means 23 having a central void portion means 32, and included in the second series of coil steel springs is a first, second, third and fourth corner spring means 38a, 38b, 38c and 38d. Each of these springs has a corresponding first, second, third and fourth center void 39a, 39b, 39c and 39d. Occupying the center voids as enumerated are first and second series of elastomer springs, which are interconnected multiple segmented elastomer springs, such as 41, 45a, 45b, 45c, and 45d. In the preferred embodiment each of these elastomer springs are monoblock and is segmented as shown at 43 in FIG. 12. All of the segments are identical and are shown in FIG. 12 in the free state. FIG. 2 shows the preload state and FIG. 15 shows the state when subject to an external load.

The friction system portion 40 of this invention is disposed within said first open end means 26 and includes the following elements. Firstly, the friction plate means 22, which is centrally disposed along said major axis 20 having a first end means 42 which extends outwardly from said hollow housing means 24, and a second end means 44 which is shown in contact with the release wedge 46. Disposed on either side of said friction plate are first and second barrier plate means 48a and 48b. Each having first and second end means 50a, 50b, and 52a, 52b, respectively, situated in said first open end means, with second end means 52a and 52b adjacent said second end 44 of said friction plate means 22. It being understood that said first and second barrier plates 48a and 48b are anchored against longitudinal movement with respect to the housing means 24 but respond to lateral pressures.

First and second friction wedge means 18a and 18b are disposed on either side of said barrier plates and have first end means 56a and 56b and second end means 58a and 58b. Said first end means extend out from said housing means while said second end means 58a and 58b are situated adjacent to said release wedge means 46. During operation, angle surfaces 59a and 59b of wedge means 18a and 18b cooperate with angle surfaces 61a and 61b of said release wedge means 46. First and second shoe means 60a and 60b are disposed one on either side of said first and second friction wedge means, each having first angle ends 62a and 62b which cooperate with the angled portion means 19a and 19b of such friction wedges, and second angled end means 64a and 64b which cooperate with the angled portion means 65a and 65b of spring seat means 66. First and second wear liner means 68a and 68b are disposed on either side of said first and second shoe means. Each being anchored to said housing means 24 against both lateral and longitudinal movement.

The release wedge means 46 includes a horizontally extending body portion means 70 and first and second tapered end means 61a and 61b which cooperate with said angled surface means 59a and 59b of said friction wedge means whereby defining a angled relationship with respect to said major axis 20.

The spring seat means 66 has a recessed portion means 67 located in the center thereof and also includes angled surface means 65a and 65b which as previously stated are designed to cooperate with the angled end means 64a and 64b of the shoe means. An angled relationship is thus defined with respect to said major axis or center line 20. The spring seat means 66 bears against a first series or middle coil spring means 23 and the first interconnected multiple segmented elastomer column or elastomer spring means 41, as well as a second series or corner coil spring means 38a, 38b, 38c and 38d, as well as the corresponding second interconnected multiple segmented elastomer columns or elastomer spring means 45a, 45b, 45c and 45d. The contact is maintained via the spring harness means 83a and 83b. The recess means 67 located in spring seat means 66 carries the inner coil means 30 which bears directly against the release wedge 46 whereby the angled portion means 61a and 61b can be brought against the corresponding portions of the friction wedge 59a and 59b.

As is apparent, the various angled surfaces define an angle. When a line passing therethrough as it was extended to the center line 20.

In order to achieve the release characteristics and frictional characteristics for meeting the M-901G-82 Specification, I have found that three angles are of importance.

Referring to FIG. 11, I have defined these angles. A first angle system means of 100 or alpha exists between the first group of angled portions 19a and 19b of the friction wedges and said first group of angle means 62a and 62b of the shoe means 60a and 60b. I have found this angle to be about 53 degrees, plus or minus 2 degrees, for optimum performance.

The shoe means 60a and 60b have a second angle system 102 or beta, between the second group of angle means 64a and 64b which cooperate with the angle means 65a and 65b of the spring seat means 66. I have found angle beta to be about 66 degrees, plus or minus 2 degrees, for optimum performance.

The third angled system 104 or gamma, which I have found to be important, is that existing between the second group of angled surface means 59a and 59b of the friction wedge means 18a and 18b and the angled means 61a and 61b of the release wedge means 46. I have discovered that in order to achieve optimum release characteristics, the angle gamma should be about 60 degrees, plus or minus 2 degrees.

As stated above, the invention hereunder consideration, involves specific angles and the use of both a coil spring, as well as an interconnected multiple segment elastomeric column spring means or monoblock, such as 41, (shown in FIGS. 12 and 13). In order to meet the M-901G-82 Specification, it is necessary to have an efficient initial preload and a strong initial spring rate during the first one-half of travel. A coil spring provides these benefits. However, the spring rate of a coil is linear. After the high initial spring rate contributed by the coil spring, it is desirable and necessary to have a very high spring rate resistance such as that contributed by an elastomer means during the final stages of travel of the draft gear. The particular combination hereunder consideration contributes about 50 tons of resistive force at the end of travel.

The first series of elastomer spring, such as 41, is an interconnected multiple segment elastomeric columnar device, and is positioned inside of the space envelope created by each helical coil spring, this resulting in a configuration of one larger elastomer spring/coil spring unit 72 being surrounded by four similar corner units 74a, b, c and d of a lesser diameter. The centrally located elastomer spring/coil spring 72 directly abuts the main spring seat while the corner units 74a, b, c and d seat against auxiliary spring seats or spring harnesses, which, in turn, abut the main spring seat. In operation the elastomer springs, as well as the coil springs, are subject to a preload in the axial direction.

The term "free height" is the length of the elastomer spring or column as it exists as a component as shown in FIG. 12. That is, the height prior to incorporation into the draft gear and preloading. When the draft gear is not subject to any outside loading, the at rest or preload height is less than the free height, as is the volume inside each coil spring. This condition is shown in FIG. 2. The full compression height is the condition which results when maximum compression of the draft gear has been achieved, resulting in the minimum height of the coil spring column and a minimum or full compression inside volume. This condition is shown in FIG. 15. It should be noted that the volume of the elastomer column does not change.

The dimensions of the particular elastomer columns used in this invention make them unstable (prone to buckling) during compression unless supported. In order to function properly, each elastomer column must have supplementary support or guidance acting on it during its operation. This is accomplished by the specific dimensioning of the inside diameter helical steel coil in which is resides. By acting as a tube encircling the elastomer column, the coil spring limits the column's freedom to lean and buckle under axial loading, during operation of the draft gear.

An extension of the buckling problem involving the tailoring of the first and second series elastomer columnar spring to the inside diameter of the first and second series of coil spring to limit buckling of the elastomer column must be balanced against not coming so close as to cause the elastomer to bulge between and become pinched between the coils at full compression. Effective guidance of the elastomer column by the coil spring has been found to occur when certain conditions and relationships between the elastomer column and the coil spring are achieved.

First, the durometer hardness of the elastomer must be compatible with this environment, that is, a draft gear with a 3¼" travel to full compression. The elastomer material must be soft enough to provide enough elasticity over the full range of travel. If the elastomer is too hard, it will not return to datum after being compressed to its full compression height. For the draft gear described herein, it was determined that the durometer hardness of the elastomeric columns should be about 40 Shore D scale, plus or minus 3 points. An elastomer material with about this hardness will operate over the full travel range and yet be tight between the housing rear wall and the spring seat or harness. It should be noted that loose, non-loaded parts within a draft gear assembly are an undesirable condition to be avoided in the operation of any gear.

The volume of elastomer material of the first and second series of elastomer column springs must be about 113%, plus or minus 2%, of the inside envelope of the coil spring at its full compression height, as shown in FIG. 15. As each combination spring unit approaches and achieves full compression height, during operation of the draft gear, the approximately 13% excess, plus or minus 2%, of elastomer will bulge as at 76 partly around the innermost point on the spring's bar helix but not far enough to become pinched between the coils as they close upon one another. Including more than the above volume of elastomer will result in excessive bulge and pinching of the elastomer between the coils of the spring, causing undesirably high forces as the coil spring unit approaches its full compression height. Using less than the recommended volume of elastomer material will diminish the efficiency of the combination elastomer spring/coil spring unit. When the elastomer material volume is less than 113%, plus or minus 2%, of the full compression inside envelope, it is also more difficult to achieve the dimensional proportions necessary to prevent buckling of the elastomer column.

The initial compression distance between free height and preload height of the elastomer column spring should be at least 20%, plus or minus 2%, of the distance measured between free height and the full compression height, when the draft gear is subjected to maximum compression. I call this latter distance the maximum compression distance. That is, the distance the column is compressed in going from its free height shown in FIG. 12, for example, to its preload height shown in FIG. 2, divided by the distance the column is compressed in going from its free height to its height at full compression shown in FIG. 15. This value should be at least 20%, plus or minus 2%. Adequate initial compression or preload of the elastomer material is needed to insure that the elastomer column remains tight in the draft gear assembly at all operating positions and temperatures. Also, sufficient preload of the elastomer material will maintain tightness of the column in the event that any setting of the material occurs over a period of time.

Referring to FIG. 11 and FIG. 14, the outside diameter 78 of the elastomer column at its widest point must be 89%, plus or minus 2%, of the inside diameter 80 of the coil spring in which it resides, when the column is at its preload height in the draft gear. If the outside diameter 78 is greater than about 91% of the coil spring inside diameter 80, excessive bulging and pinching of the material will occur as the elastomer spring/coil spring unit nears its full compression height shown in FIG. 15. An elastomer spring material diameter of less than about 87% of the I.D. of the coil spring allows too much freedom for the elastomer column to buckle as it is compressed.

The number of elastomer segments, such as 82 in FIG. 14, employed in the elastomeric column should also be selected to augment the conditions stated above. Deviating from the optimum number of segments by more than plus or minus one will adversely affect the performance of the elastomer spring. For the draft gear of this invention, the larger centrally located elastomer column 41 comprises five interconnected segments, while the corner elastomer columns 45a–45d each contain nine segments. If too few segments are employed, the bulges tend to be excessive at full compression and pinching between the coils may result. Too many segments makes the elastomer column more difficult to form, due to the length and diameter proportions of the individual segments. An excessive number of segments may also not yield an outside diameter that is large enough to effectively limit buckling, i.e., 89%, plus or minus 2%, of the coil spring inside diameter.

Although a particular preferred embodiment of the invention has been disclosed above, for illustrative purposes, it will be understood that variations or modifications thereof which lie within the scope of the appended claims are fully contemplated.

The embodiments of the invention in which an exclusive property or privilege is claimed are defined as follows:

What I claim is:

1. A friction elastomer draft gear having a center line along its major axis and which when first tested generates impact forces below 500,000 lbs. when 70 ton rail cars are impacted at speeds of at least five miles per hour, which even after considerable energy input and wearing in of parts when second tested generates impact forces below 500,000 lbs. when 70 ton rail cars are impacted at speeds of at least five miles per hour comprising:
   a hollow housing having a generally tubular body with a first open end and a second closed end including:
   a friction plate centrally disposed along said major axis having a first end which extends out of said hollow housing and a second end situated down in said first open end;
   first and second barrier plates disposed one on either side of said friction plate, said first and second barrier plates being anchored against longitudinal movement and responding to lateral pressure;
   first and second friction wedges, said first friction wedge being disposed on one side of said first barrier plate and said second friction wedge being disposed on one side of said second barrier plate, each of said first and second friction wedges having first and second angled surfaces;
   first and second shoes, said first shoe being disposed on one side of said first friction wedge and said second shoe being disposed on one side of said second friction wedge, each of said first and second shoes having first and second angled surfaces, said first angled means of said friction wedge means cooperating with said first angled means of said shoe means to define an angle with respect to said center line of about 53 degrees, plus or minus 2 degrees.
   first and second wear liner plates, said first wear liner plate being disposed on one side of said first shoe and said second wear liner plate being disposed on one side of said second shoe and being anchored to said first open end against longitudinal and lateral movement;
   a release wedge having a horizontally extending body portion and angle portions, said angle portions cooperating with second angle portions of said friction wedges to define an angle with respect to said center line of about 60 degrees, plus or minus 2 degrees;
   a spring seat exerting force against said shoes and having angled portions cooperating with said second angled portions of said shoes to define an angle with respect to said center line of about 66 degrees, plus or minus 2 degrees;
   a spring system disposed within said hollow housing adjacent said second closed end including:
   a first series of coil springs having a center void portion, said center void portion being occupied by a first series of elastomer column spring; and
   a second series of coil springs having center void portions, each of said center void portions being occupied by a second series of elastomer column springs.

2. The draft gear mechanism of claim 1 wherein;
said interconnected multiple segmented elastomer column occupying the center void portion of said first series of coil springs has five interconnected segments; and
said interconnected multiple segmented elastomer columns occupying the center void portions of said second series of coil springs have nine segments.

3. The draft gear mechanism of claim 1 wherein:
said interconnected multiple segmented elastomer column in said first series of coil spring, has a durometer hardness of about 40 Shore D scale, plus or minus 3 points; and
said interconnected multiple segmented elastomer columns in said second series of coil springs have a durometer hardness of about 40 Shore D scale, plus or minus 3 points.

4. The draft gear mechanism of claim 1 wherein:
said first and second series of coil springs have a full compression inside envelope when said first and second series of coil springs are at their full compression height; and
said first and second series of elastomer column springs have a volume of about 113%, plus or minus 2%, of said full compression inside envelopes of said first and second series of coil springs.

5. The draft gear mechanism of claim 4 wherein:
said first and second series of coil springs have inside diameters; and
said first and second interconnected multiple segmented elastomer columns have preload heights and have outside diameters of 89%, plus or minus 2%, of said inside diameters, when said first and second interconnected multiple segmented elastomer columns are at the preload height.

6. The draft gear mechanism of claim 5 wherein:
said first and second interconnected multiple segmented elastomer columns have initial compression distances and maximum compression distances, said initial compression distances being at least 20%, plus or minus 2%, of the maximum compression distance.

7. A friction elastomer draft gear having a center line along its major axis and which meets the requirements of the Association of American Railroads Specification M-901G-82 comprising:
   a friction system having, a first angle with respect to said center line of 53 degrees, plus or minus 2 degrees, a second angle with respect to said center line of 66 degrees, plus or minus 2 degrees, and a third angle with respect to said center line of 60 degrees, plus or minus 2 degrees;
   a first and second series of coil springs having first and second inside envelopes;

a first and second series of elastomer springs, one series situated within each of said first and second inside envelopes, said elastomer spring being manufactured of a polyetherester composition.

8. The draft gear mechanism of claim 7 wherein:
said first and second series of coil springs have full compression first and second inside envelopes when said said coil springs are at their full compression height; and
said first and second series of elastomer springs have volumes of about 113%, plus or minus 2%, of said full compression first and second inside envelopes.

9. The draft gear mechanism of claim 8 wherein:
said first and second series of coil springs have inside diameters; and
said first and second series of elastomer springs have a preload height and outside diameters of 89%, plus or minus 2%, of said inside diameters when said first and second series of elastomer springs are at said preload height.

* * * * *